United States Patent
Jee et al.

(10) Patent No.: US 10,384,517 B2
(45) Date of Patent: Aug. 20, 2019

(54) ELECTRIFICATION APPARATUS FOR ELECTROSTATIC DUST COLLECTOR

(71) Applicant: Hanon Systems, Daejeon-si (KR)

(72) Inventors: Yong Jun Jee, Daejeon-si (KR); Ji Yong Park, Daejeon-si (KR)

(73) Assignee: HANON SYSTEMS, Daejeon-si (KR)

(*) Notice: Subject to any disclaimer, the term of this patent is extended or adjusted under 35 U.S.C. 154(b) by 0 days.

(21) Appl. No.: 15/122,466

(22) PCT Filed: Jan. 18, 2016

(86) PCT No.: PCT/KR2016/000493
§ 371 (c)(1),
(2) Date: Aug. 30, 2016

(87) PCT Pub. No.: WO2016/133286
PCT Pub. Date: Aug. 25, 2016

(65) Prior Publication Data
US 2017/0341489 A1    Nov. 30, 2017

(30) Foreign Application Priority Data

Feb. 17, 2015  (KR) .................. 10-2015-0023910

(51) Int. Cl.
*B60H 3/00*    (2006.01)
*B03C 3/40*    (2006.01)
(Continued)

(52) U.S. Cl.
CPC ........... *B60H 3/0078* (2013.01); *B01D 53/32* (2013.01); *B03C 3/40* (2013.01); *B03C 3/41* (2013.01);
(Continued)

(58) Field of Classification Search
CPC .... B03C 3/40; B03C 3/41; B03C 3/86; B01D 2257/106; B60H 3/0078; F24F 3/166
See application file for complete search history.

(56) References Cited

U.S. PATENT DOCUMENTS 5,322,550 A * 6/1994 Park ..................... B03C 3/40
96/66
5,492,557 A * 2/1996 Vanella ................. B03C 3/017
422/121
(Continued)

FOREIGN PATENT DOCUMENTS

CN     103762505    * 1/2014 ......... B03C 2201/10
CN     203862385 U  10/2014
(Continued)

*Primary Examiner* — Amber R Orlando
*Assistant Examiner* — Sonji Turner
(74) *Attorney, Agent, or Firm* — Shumaker, Loop & Kendrick, LLP; James D. Miller

(57) ABSTRACT

An electrification apparatus for an electrostatic dust collector, including: a first electrode part having a shape of a plate having a plurality of through holes formed thereon in such a manner as to apply one of positive and negative electrodes thereto; and a second electrode part having protrusions each having a plurality of fine conductive fibers in such a manner as to protrude outwardly from the through holes of the first electrode part, whereby electrification performance is improved and harmful ozone and electromagnetic waves are reduced.

12 Claims, 14 Drawing Sheets

(51) Int. Cl.
   *B01D 53/32* (2006.01)
   *F24F 3/16* (2006.01)
   *B03C 3/86* (2006.01)
   *B03C 3/41* (2006.01)

(52) U.S. Cl.
   CPC ............... *B03C 3/86* (2013.01); *F24F 3/166* (2013.01); *B01D 2257/106* (2013.01); *B03C 2201/10* (2013.01)

(56) References Cited

U.S. PATENT DOCUMENTS

| | | | | |
|---|---|---|---|---|
| 5,622,543 | A * | 4/1997 | Yang | B03C 3/011 55/485 |
| 6,193,788 | B1 * | 2/2001 | Nojima | B03C 3/40 29/34 R |
| 6,368,392 | B1 * | 4/2002 | Ohtake | B03C 3/38 96/100 |
| 6,506,238 | B1 * | 1/2003 | Endo | B03C 3/12 96/79 |
| 7,267,712 | B2 * | 9/2007 | Chang | B03C 3/09 96/77 |
| 7,438,747 | B2 * | 10/2008 | Luo | H01T 23/00 361/226 |
| 7,655,076 | B2 * | 2/2010 | Griffiths | B03C 3/011 96/64 |
| 7,976,616 | B2 * | 7/2011 | Alam | B03C 3/41 313/351 |
| 8,192,536 | B2 * | 6/2012 | Tanaka | B03C 3/09 96/98 |
| 8,498,092 | B2 * | 7/2013 | Itani | B03C 3/09 361/231 |
| 8,657,937 | B2 * | 2/2014 | Motegi | B03C 3/011 96/100 |
| 8,889,079 | B2 * | 11/2014 | Zahedi | B01D 53/323 422/171 |
| 2011/0171094 | A1 * | 7/2011 | Zahedi | B01D 53/323 423/245.1 |
| 2014/0009860 | A1 * | 1/2014 | Lee | H01T 23/00 361/230 |
| 2015/0075379 | A1 * | 3/2015 | Vanella | B03C 3/41 96/77 |
| 2015/0143839 | A1 * | 5/2015 | Lee | F24F 1/0007 62/426 |
| 2016/0204581 | A1 * | 7/2016 | Nishida | B03C 3/38 250/423 F |
| 2018/0053620 | A1 * | 2/2018 | Nishida | A61L 9/22 |
| 2018/0053621 | A1 * | 2/2018 | Nishida | A61L 9/22 |
| 2018/0243462 | A1 * | 8/2018 | Okano | A61L 9/22 |

FOREIGN PATENT DOCUMENTS

| | | |
|---|---|---|
| JP | 10-043634 | 2/1998 |
| JP | 2001-276648 | 10/2001 |
| KR | 100505276 | 7/2005 |
| KR | 100671232 B1 | 1/2007 |
| KR | 100856708 B1 | 9/2008 |
| KR | 100905722 B1 | 7/2009 |
| KR | 101032614 B1 * | 5/2011 |
| KR | 1020110088742 A | 8/2011 |
| KR | 1020110095329 | 8/2011 |
| WO | WO2007102701 * | 9/2007 |

* cited by examiner

ELECTRIFICATION APPARATUS FOR ELECTROSTATIC DUST COLLECTOR

CROSS-REFERENCE TO RELATED PATENT APPLICATIONS

This patent application is a United States national phase patent application based on PCT/KR2016/000493 filed Jan. 18, 2016, which claims the benefit of Korean Patent Application No. 10-2015-0023910 filed Feb. 17, 2015, the disclosures of which are hereby incorporated herein by reference in their entirety.

TECHNICAL FIELD

The present invention relates to an electrification apparatus for an electrostatic dust collector, and more particularly, to an electrification apparatus for an electrostatic dust collector that has high electrification performance through protrusions each having a plurality of fine conductive fibers, thereby reducing harmful ozone and electromagnetic waves.

BACKGROUND ART

A car's interior is small and closed, and it may be easily polluted. Further, such pollution becomes more serious due to fine dust and all kinds of pollutants in a city. With the continuous increase in the distribution rate of vehicles as well as with the extension in a driver's staying time in his or her vehicle, studies on the maintenance of air freshness inside the vehicle have been made.

An example for the purification of the car's interior is disclosed in Korean Patent Publication Laid-Open No. 10-2004-97758 entitled 'air purifier for vehicle', which is adapted to allow the microorganisms collected through the process of air purification to be sterilized to introduce more clean air into the interior of the vehicle. As shown in FIG. 1, the conventional air purifier for a vehicle includes a case 50 having an inlet 51 and an outlet 52, a first filter 60 disposed behind the inlet 51 to collect foreign matters or dust thereto, an electrostatic dust collector 70 adapted to allow fine dust to adhere thereto through discharging of electricity, a second filter 90 disposed in front of the outlet 52 of the case 50, coated with a photocatalyst, and adapted to dissolve organic matters and sterilize harmful microorganisms, and an ultraviolet lamp 80 disposed between the electrostatic dust collector 70 and the second filter 90 to activate the photocatalyst of the second filter 90.

Under the above-mentioned configuration, the conventional air purifier for a vehicle can sterilize the harmful microorganisms and at the same time dissolve the organic matters through the photocatalyst activated by the ultraviolet rays irradiated from the ultraviolet lamp 80, thereby removing bad odor generation sources. In more detail, the air introduced through the inlet 51 of the case 50 is filtered through the first filter 60, and in this case, the first filter 60 serves to filter dust having relatively large particle sizes. The primarily filtered air is then introduced into the electrostatic dust collector 70, and in this case, if power is supplied through a power supply part 73, fine dust particles charged by a discharge electrode 71 adhere to a dust collection electrode 72. Accordingly, the fine dust passing through the first filter 60 is removed by means of the electrostatic dust collector 70. While the air passing through the electrostatic dust collector 70 is flowing to the second filter 90, microorganisms like germs or molds contained in the air are sterilized by means of the ultraviolet rays irradiated from the ultraviolet lamp 80. Further, the second filter 90 dissolves the organic matters like ammonia by using the photocatalyst activated by the ultraviolet rays irradiated from the ultraviolet lamp 80, thereby avoiding the generation of bad odors, and also, it sterilizes and removes the harmful microorganisms like germs or molds contained in the collected fine dust. Accordingly, the air discharged through the outlet 52 of the case 50 becomes clean so that it does not contain any dust and harmful microorganisms therein.

So as to purify the indoor air of the vehicle, that is, the conventional air purifier for a vehicle has the various filters to which fine dust is collected and the ultraviolet lamp for sterilization.

By the way, fine dust collection is classified into a filtering way in which dust particles having given diameters or more are filtered through a dust filter, a collecting way in which germs, molds and bad odor generation sources are collected through an activated carbon filter, and a collecting way in which dust is discharged to have a given charge and is then collected.

The dust filter and the activated carbon filter remove the dust through collection, so that they should be exchanged with new ones. Contrarily, the filter used for the electrostatic dust collection is not exchanged at all with new one, and it can effectively remove even small particles.

FIG. 2 is a schematic view showing a dust collection operation of the electrostatic dust collector 70 as the filter used for the electrostatic dust collection, and as shown, the electrostatic dust collector 70 includes the discharge electrode 71 having a discharge plate 71a and a discharge pin 71b for charging introduced dust D by means of corona discharge and the dust collection electrode 72 for collecting the dust D' charged through the discharge electrode 71 thereto.

By the way, the electrostatic dust collector 70 as shown in FIG. 2 is charged by means of the corona discharge, thereby causing electromagnetic wave noise and ozone to be generated from the sharp end of the discharge pin 71b. As a result, undesirably, the electromagnetic wave noise obstructs the operations of various equipment at the interior of the vehicle, and the ozone is harmful to the human body, so that there is a need to provide separate means for removing the ozone.

Accordingly, the present invention has been made in view of the above-mentioned problems occurring in the prior art, and it is an object of the present invention to provide an electrification apparatus for an electrostatic dust collector that has high electrification performance through protrusions each having a plurality of fine conductive fibers, thereby reducing harmful ozone and electromagnetic waves.

TECHNICAL SOLUTION

To accomplish the above-mentioned object, according to the present invention, there is provided an electrification apparatus for an electrostatic dust collector, including: a first electrode part having a shape of a plate having a plurality of through holes formed thereon in such a manner as to apply one of positive and negative electrodes thereto; and a second electrode part having protrusions each having a plurality of fine conductive fibers in such a manner as to protrude outwardly from the through holes of the first electrode part, whereby electrification performance is improved and harmful ozone and electromagnetic waves are reduced.

According to the present invention, desirably, the first electrode part has the plurality of through holes and the second electrode part has frames each supporting the protrusions corresponding to the two or more through holes of the first electrode part thereagainst.

According to the present invention, desirably, the frames and the protrusions of the second electrode part are fixed to each other by means of welding.

According to the present invention, desirably, the second electrode part has connectors for fixing the protrusions thereto, and the connectors are fixed to the frames.

According to the present invention, desirably, one of each connector and each frame of the second electrode part has a convex portion formed thereon and the other has a concave portion formed thereon in such a manner as to fixedly insert the convex portion thereinto.

According to the present invention, desirably, each connector and each frame of the second electrode part are fixed to each other by means of welding.

According to the present invention, desirably, each connector of the second electrode part is fixed to the side surface of each frame, thereby minimizing the whole height of the second electrode part.

According to the present invention, desirably, each protrusion has a fixing portion adapted to fix one side of the plurality of fine conductive fibers thereto.

According to the present invention, desirably, the protrusions have circular or oval shapes, and the through holes of the first electrode part have circular or oval shapes, so that the electrification apparatus for the electrostatic dust collector according to the present invention may have a shape whose curvature is varied like a circle or oval through the second electrode part using the plurality of fine conductive fibers and the electrification occurs over the plurality of fine conductive fibers to maintain high electrification performance uniformly and stably.

According to the present invention, desirably, the protrusions of the second electrode part are connected to an electric wire, and a mounting part is further provided to protect the second electrode part and enhance electrification performance through prevention of unnecessary electrification, the mounting part being made of an insulation material and having mounting holes formed thereon in such a manner as to allow the protrusions of the second electrode part to protrude outwardly therefrom.

According to the present invention, the electrification apparatus for the electrostatic dust collector has high electrification performance through the protrusions each having the plurality of fine conductive fibers, thereby reducing harmful ozone and electromagnetic waves.

MODE FOR INVENTION

Hereinafter, an explanation on an electrification apparatus for an electrostatic dust collector according to the present invention will be in detail given with reference to the attached drawings.

Figure 1:
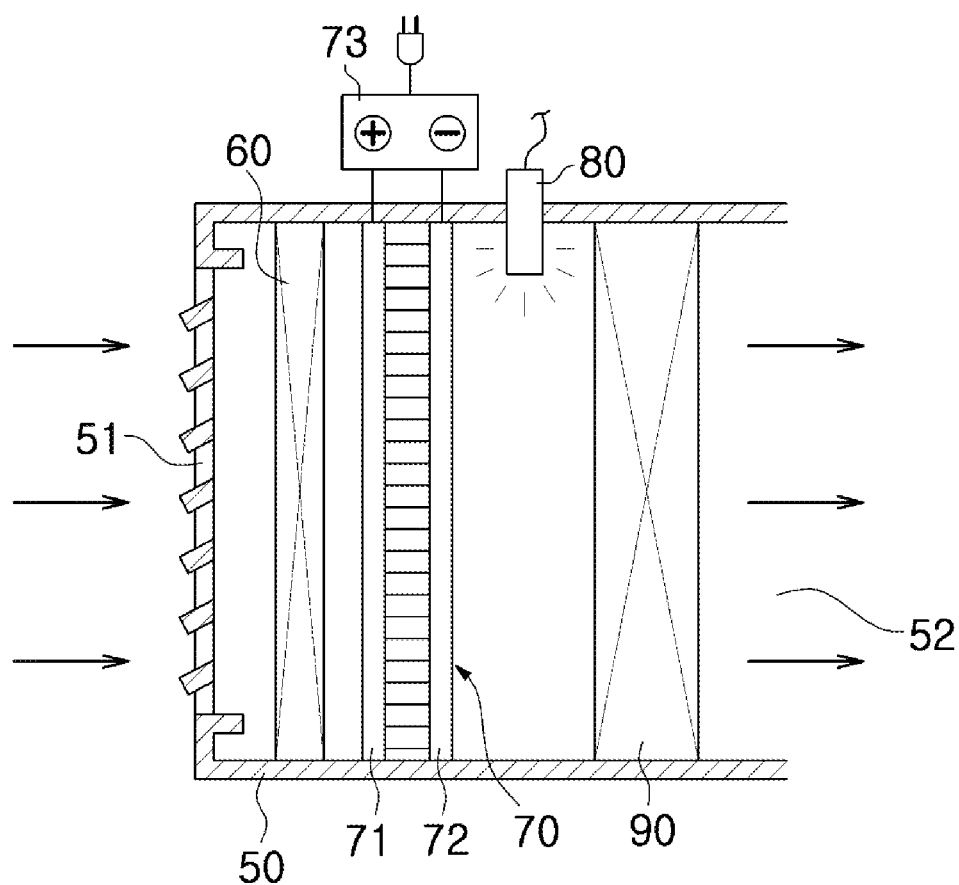
FIG. 1 is a sectional view showing a conventional air purifier for a vehicle.
Figure 2:
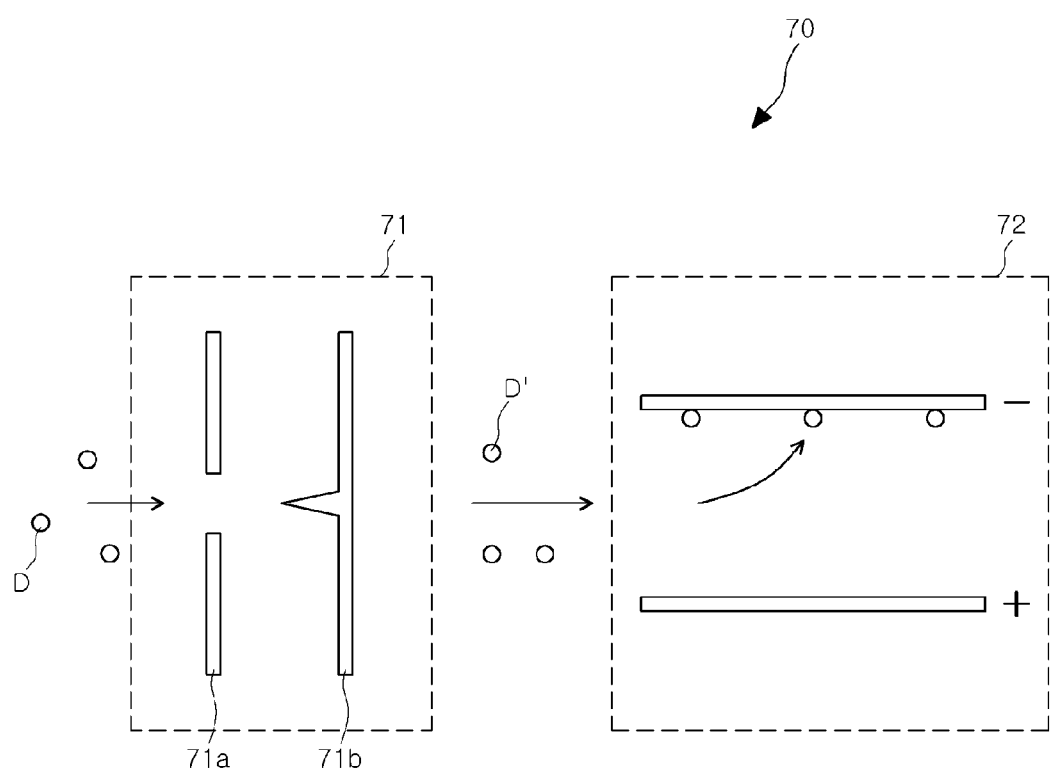
FIG. 2 is a schematic view showing the operation of a conventional electrostatic dust collector.
Figure 3:
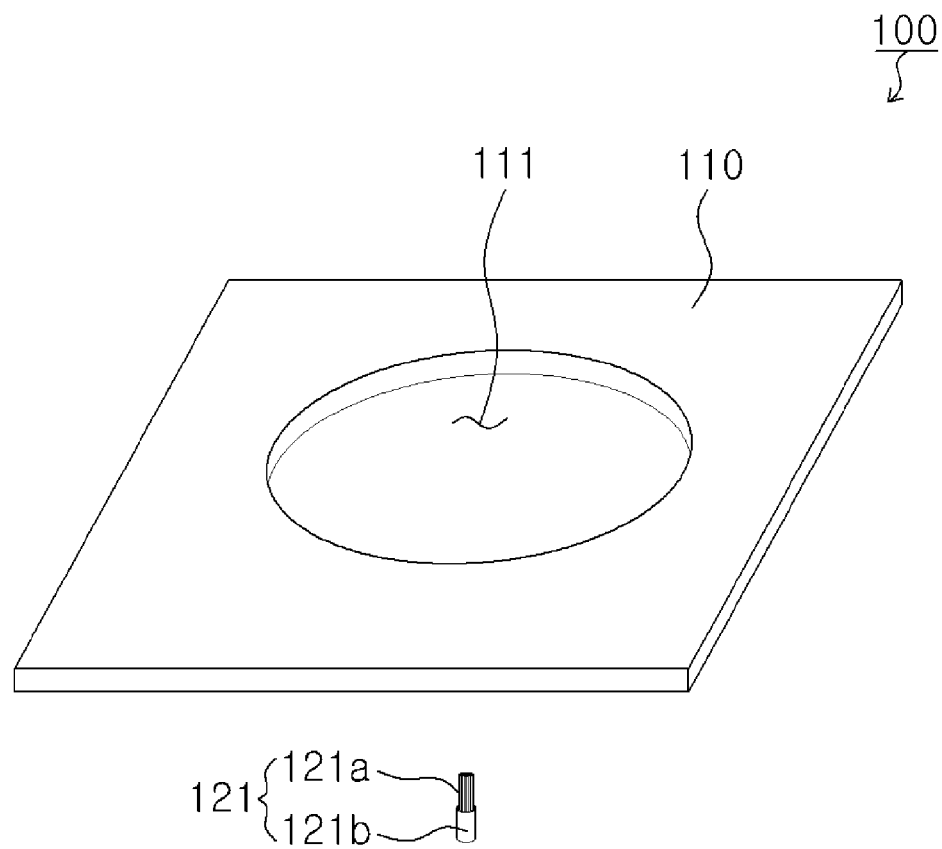
FIG. 3 is a perspective view showing an electrification apparatus for an electrostatic dust collector according to one embodiment of the present invention.
Figure 4:
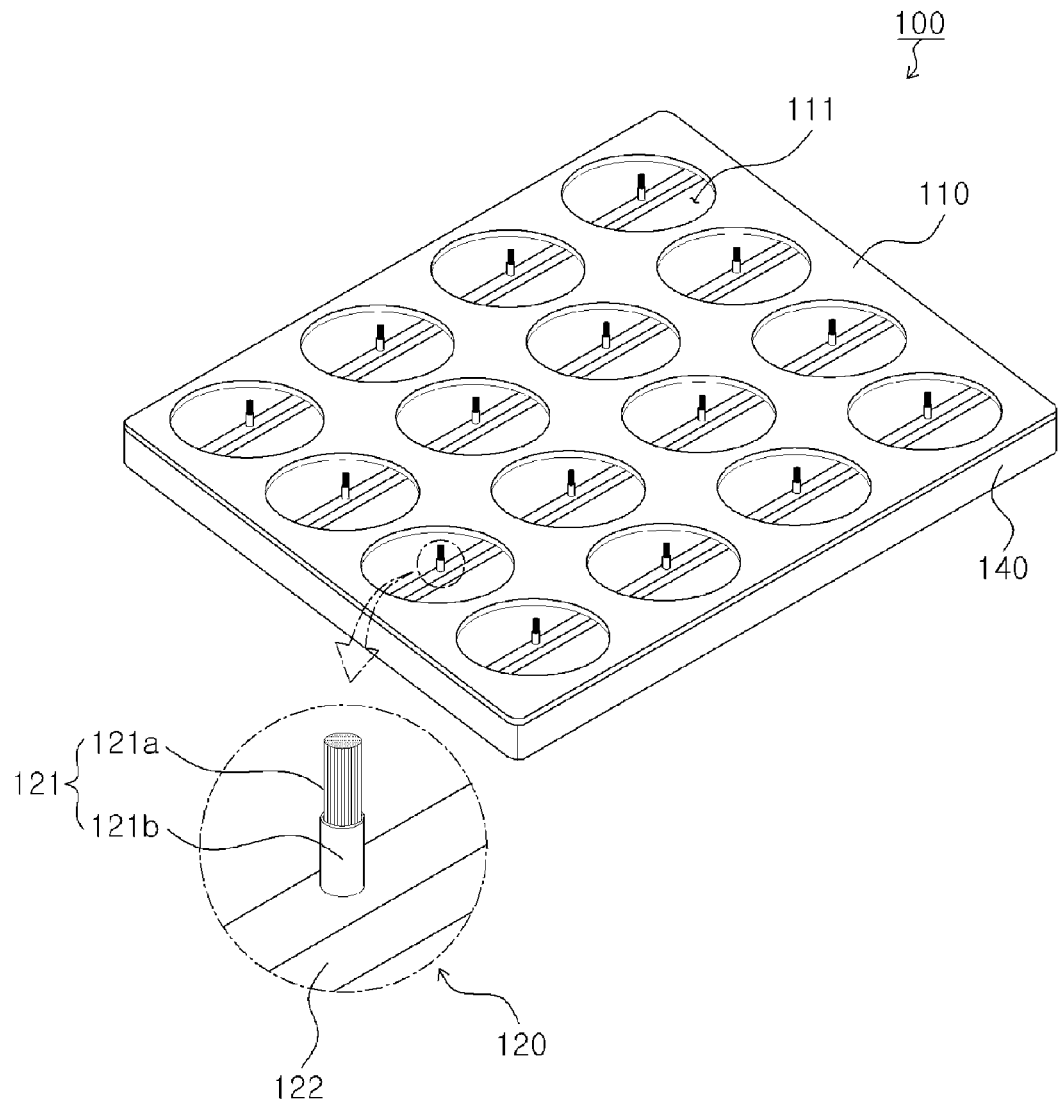
FIGS. 4 to 6 are perspective, exploded perspective and partially plan views showing the electrification apparatus for the electrostatic dust collector according to the present invention.
Figure 5:
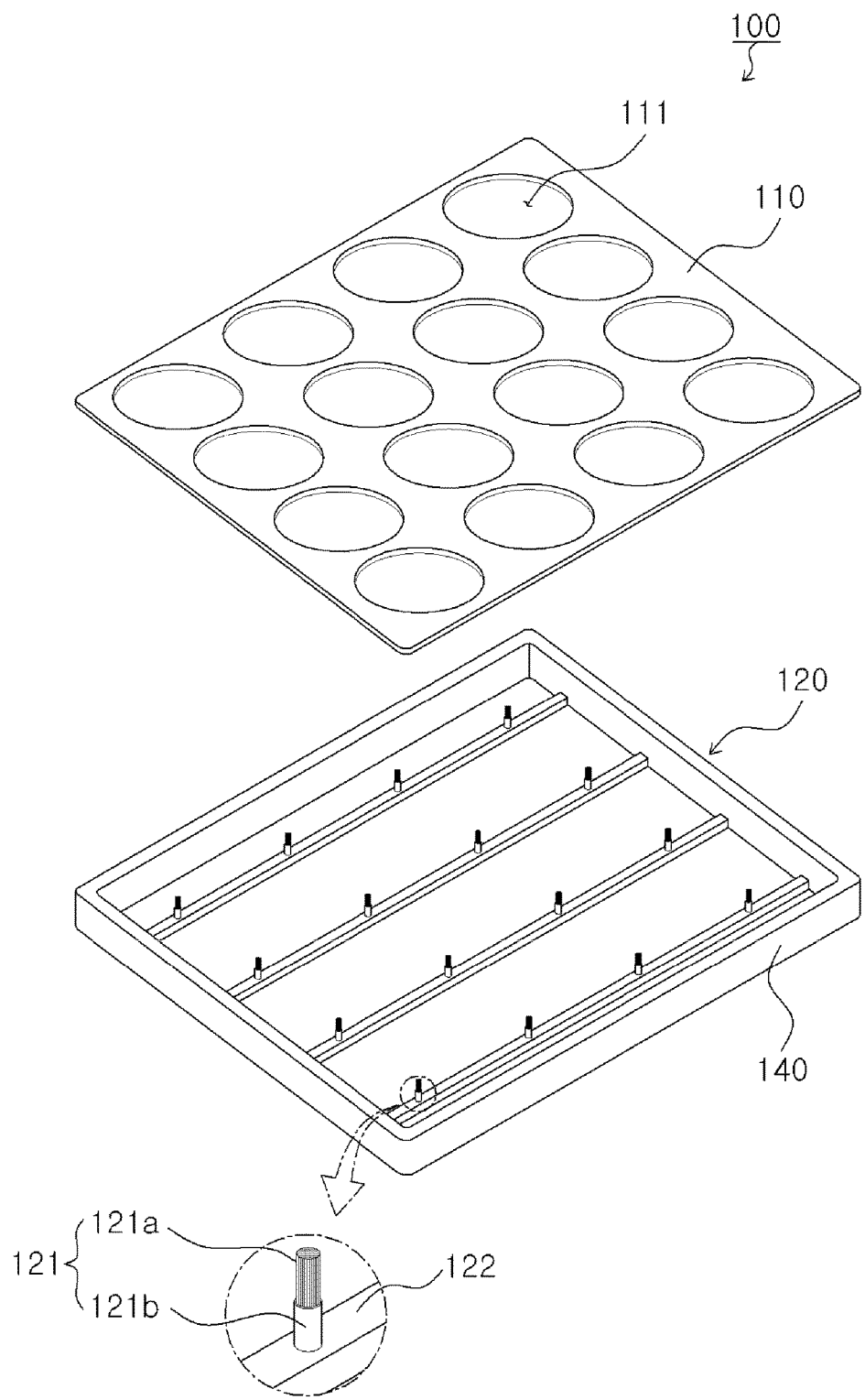
Figure 6:
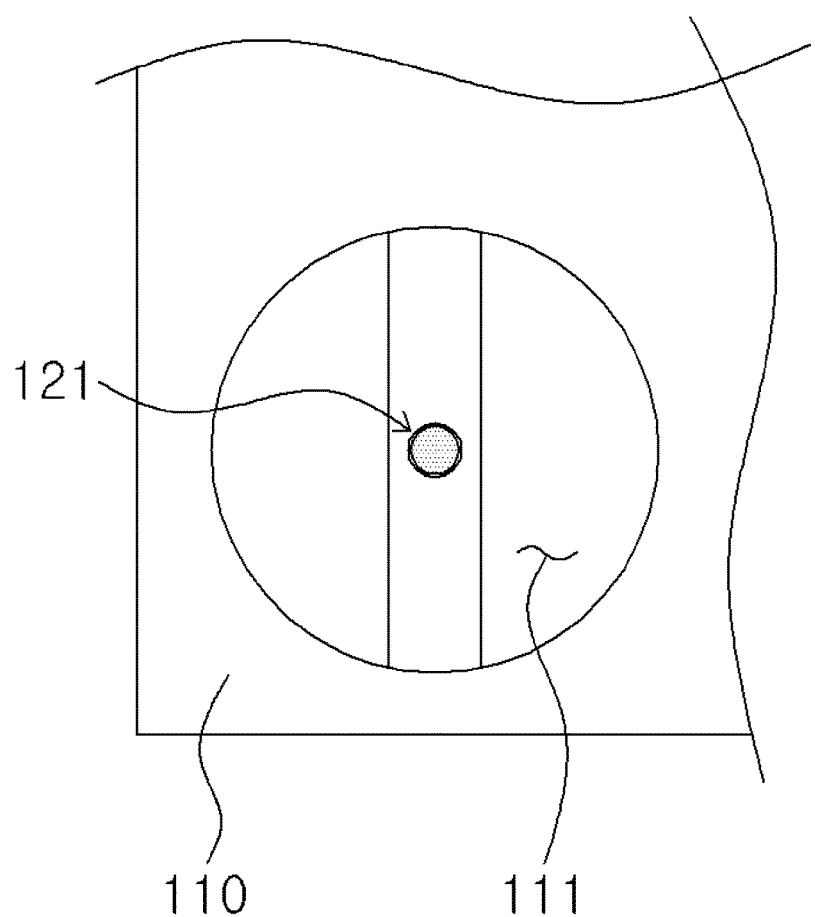
Figure 9:
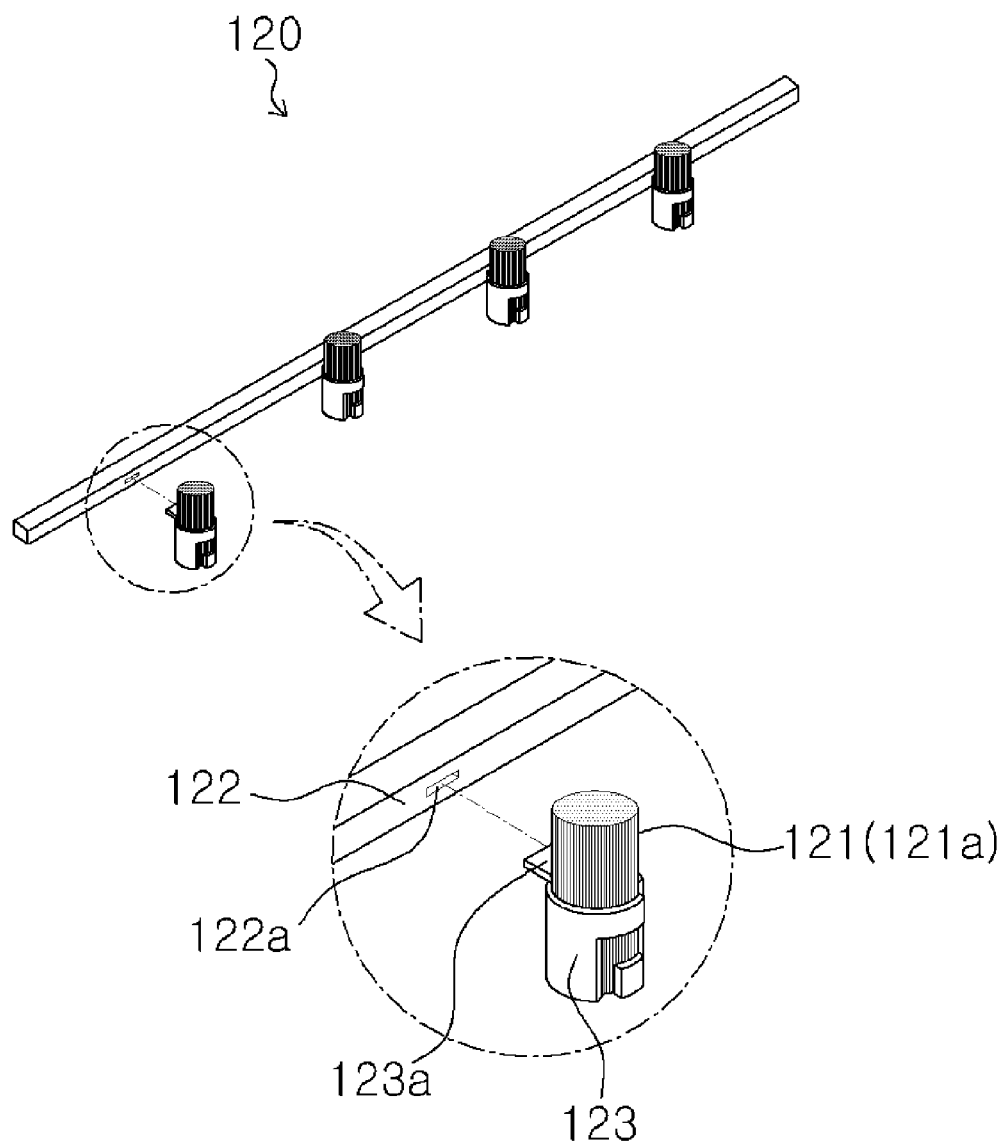
Figure 10:
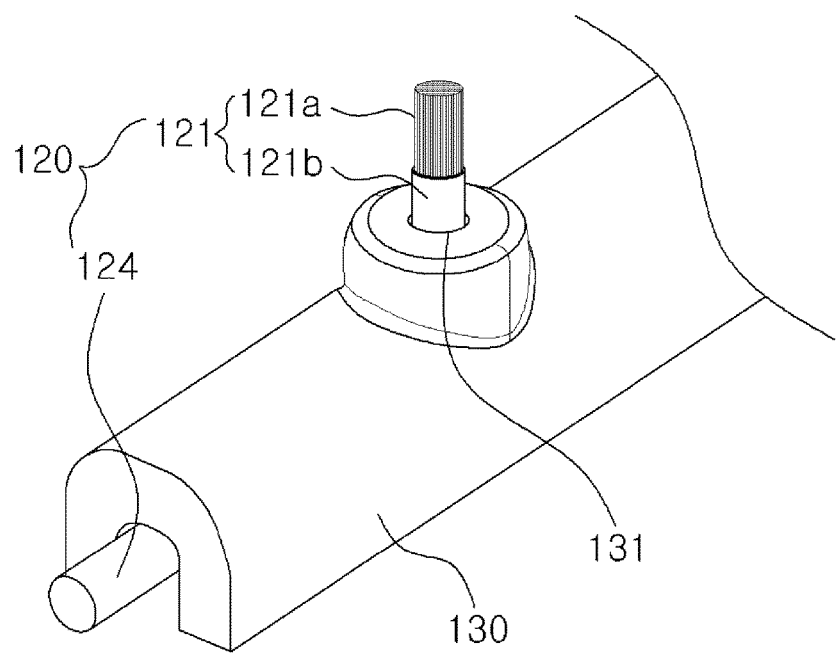
Figure 11:
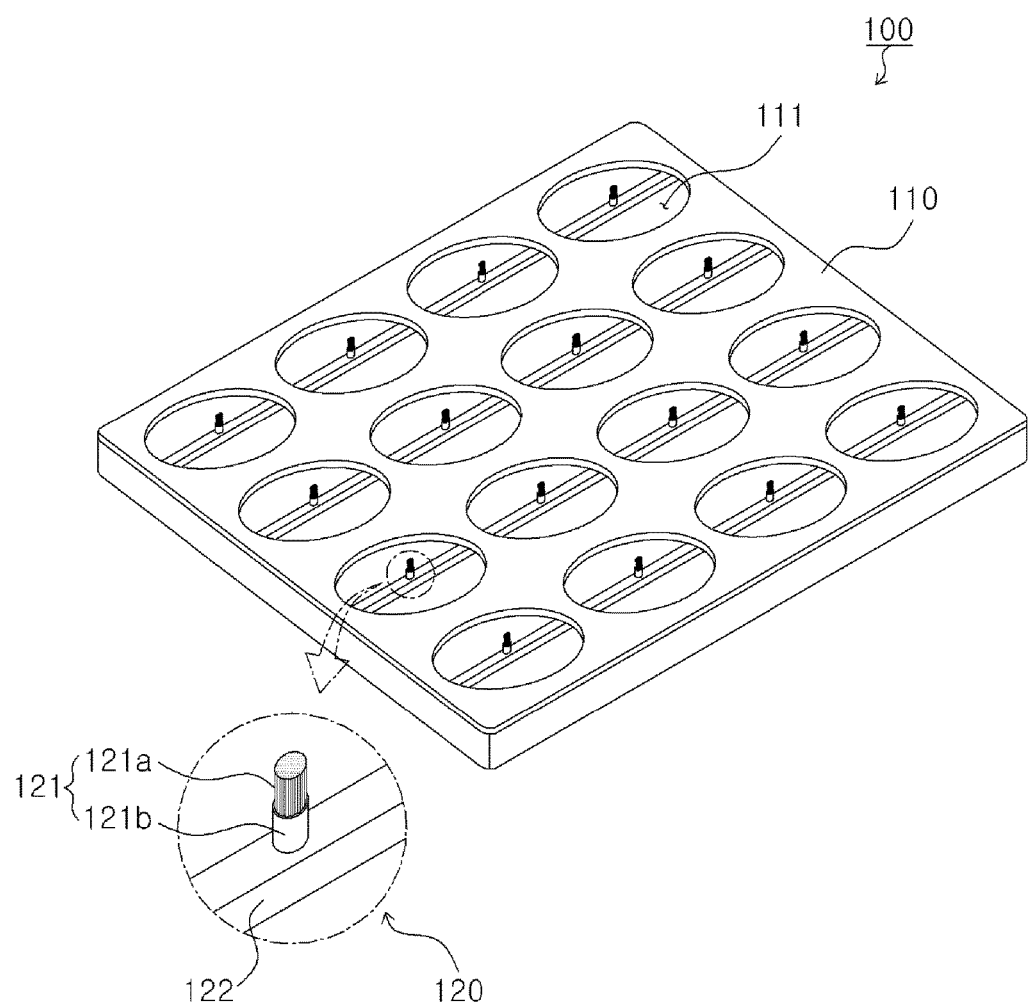
FIGS. 11 and 12 are perspective and partially plan views showing an electrification apparatus for an electrostatic dust collector according to another embodiment of the present invention.
Figure 12:
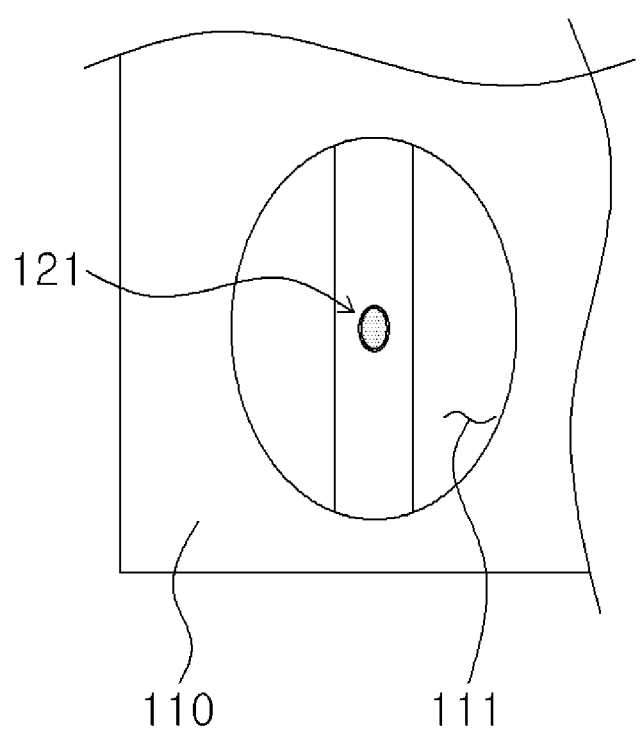
Figure 13:
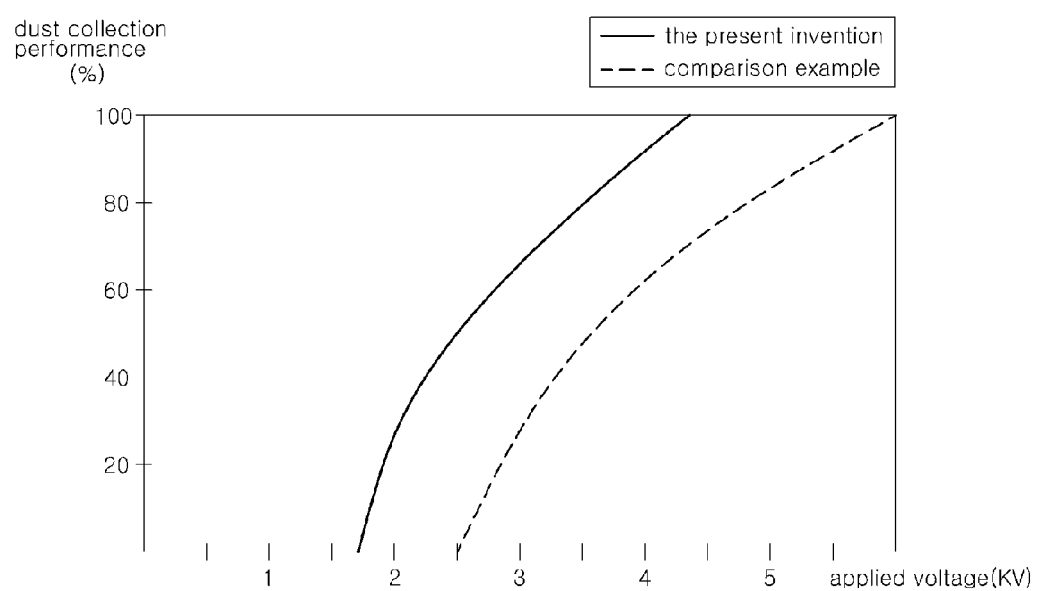
FIGS. 13 and 14 are graphs showing the electrostatic dust collection performance and ozone contents according to the applied voltages to the electrification apparatus for the electrostatic dust collector according to the present invention.
Figure 14:
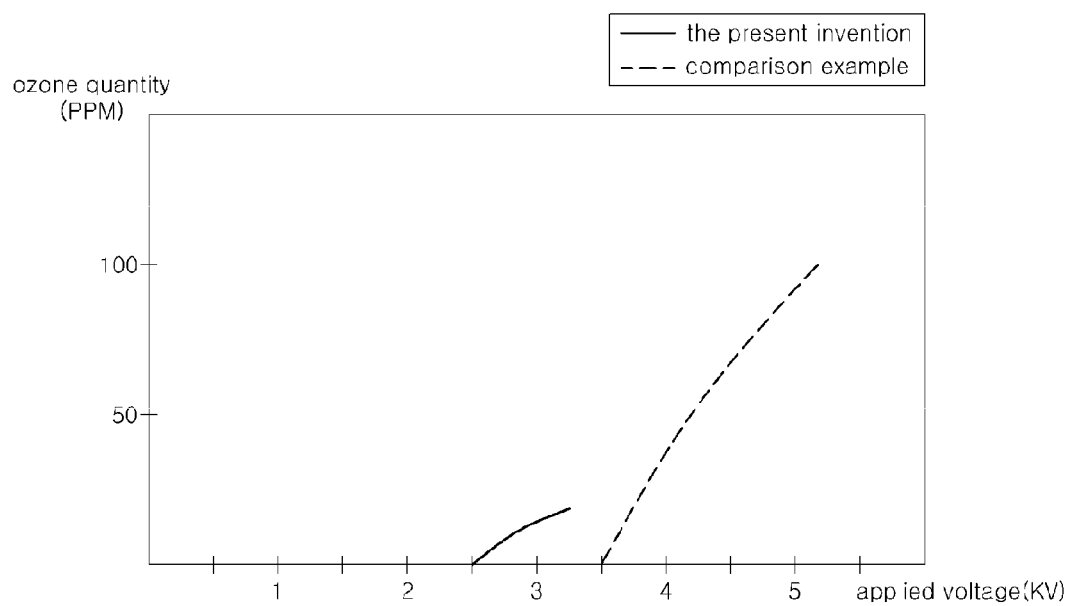

FIG. 3 is a perspective view showing an electrification apparatus for an electrostatic dust collector according to one embodiment of the present invention, FIGS. 4 to 6 are perspective, exploded perspective and partially plan views showing the electrification apparatus for the electrostatic dust collector according to the present invention, FIGS. 7 to 10 are perspective views showing a variety of second electrode parts for the electrification apparatus for the electrostatic dust collector according to the present invention, FIGS. 11 and 12 are perspective and partially plan views showing an electrification apparatus for an electrostatic dust collector according to another embodiment of the present invention, and FIGS. 13 and 14 are graphs showing the electrostatic dust collection performance and ozone contents according to the applied voltages to the electrification apparatus for the electrostatic dust collector according to the present invention.

An electrification apparatus 100 for an electrostatic dust collector according to one embodiment of the present invention largely includes a first electrode part 110 and a second electrode part 120.

The first electrode part 110 has a shape of a plate made of a conductive material to which one of positive and negative electrodes is applied and includes a plurality of through holes 111 formed thereon.

The second electrode part 120, to which a different electrode from the electrode applied to the first electrode part 110 is applied, charges dust cooperatively with the first electrode part 110. At this time, the second electrode part 120 includes protrusions 121 each having a plurality of fine conductive fibers 121a. Further, the fine conductive fibers 121a are fixed by means of a fixing portion 121b. As shown in FIGS. 3 to 8, for example, each protrusion 121 includes the fine conductive fibers 121a and the fixing portion 121b for fixing the fine conductive fibers 121a thereto. As shown in FIG. 9, on the other hand, the fine conductive fibers 121a of the protrusion 121 are fixed by means of a connector 123, which will be discussed later. The number of protrusions 121 corresponds to the number of the plurality of through holes 111, and accordingly, the second electrode part 120 includes frames 122 each adapted to support two or more protrusions 121 thereagainst. Further, the fixed structure of the protrusions 121 to the frames 122 will be explained later.

In more detail, if the positive electrode is applied to the first electrode part 110 and the negative electrode to the second electrode part 120 in the electrification apparatus 100 for the electrostatic dust collector according to the present invention, the electric fields from the protrusions 121 toward the inner peripheral surfaces of the through holes 111 are gently formed, and accordingly, electrification for the fine dust passing through the first electrode part 110 and the second electrode part 120 can be dynamically achieved.

On the other hand, as shown in FIGS. 3 to 5, the protrusions 121 and the through holes 111 of the first electrode part 110 in the electrification apparatus 100 for the electrostatic dust collector according to the present invention have circular shapes. Further, as shown in FIGS. 11 and 12, the protrusions 121 and the through holes 111 of the first electrode part 110 in an electrification apparatus 100 for the electrostatic dust collector according to another embodiment of the present invention have oval shapes. That is, the electrification apparatus 100 for the electrostatic dust collector according to the present invention can be manufactured to a variety of shapes through the formation of the protrusions 121 each having the fine conductive fibers 121a and can maintain more uniform and stable electrification performance than the conventional pin-shaped protrusions. Moreover, the electrification apparatus 100 for the electrostatic dust collector according to the present invention can be minimized in the whole size thereof.

In addition, the electrification apparatus 100 for the electrostatic dust collector according to the present invention is configured to allow the protrusions 121 and the frames 122 to be fixed integrally to each other by means of welding.

Further, the electrification apparatus 100 for the electrostatic dust collector according to the present invention includes the connectors 123 adapted to fix the protrusions 121 thereto, and the connectors 123 are fixed to the frames 122. That is, the connectors 123 are fixed to the frames 122, while fixing the protrusions 121 thereto. At this time, as shown in FIGS. 7 and 8, the connector 123 can be provided even when each protrusion 121 has the fine conductive fibers 121a and the fixing portion 121b, and as shown in FIG. 9, the connector 123 fixes the fine conductive fibers 121a, instead of the fixing portion 121b, when each protrusion 121 has only the fine conductive fibers 121a.

Figure 7:
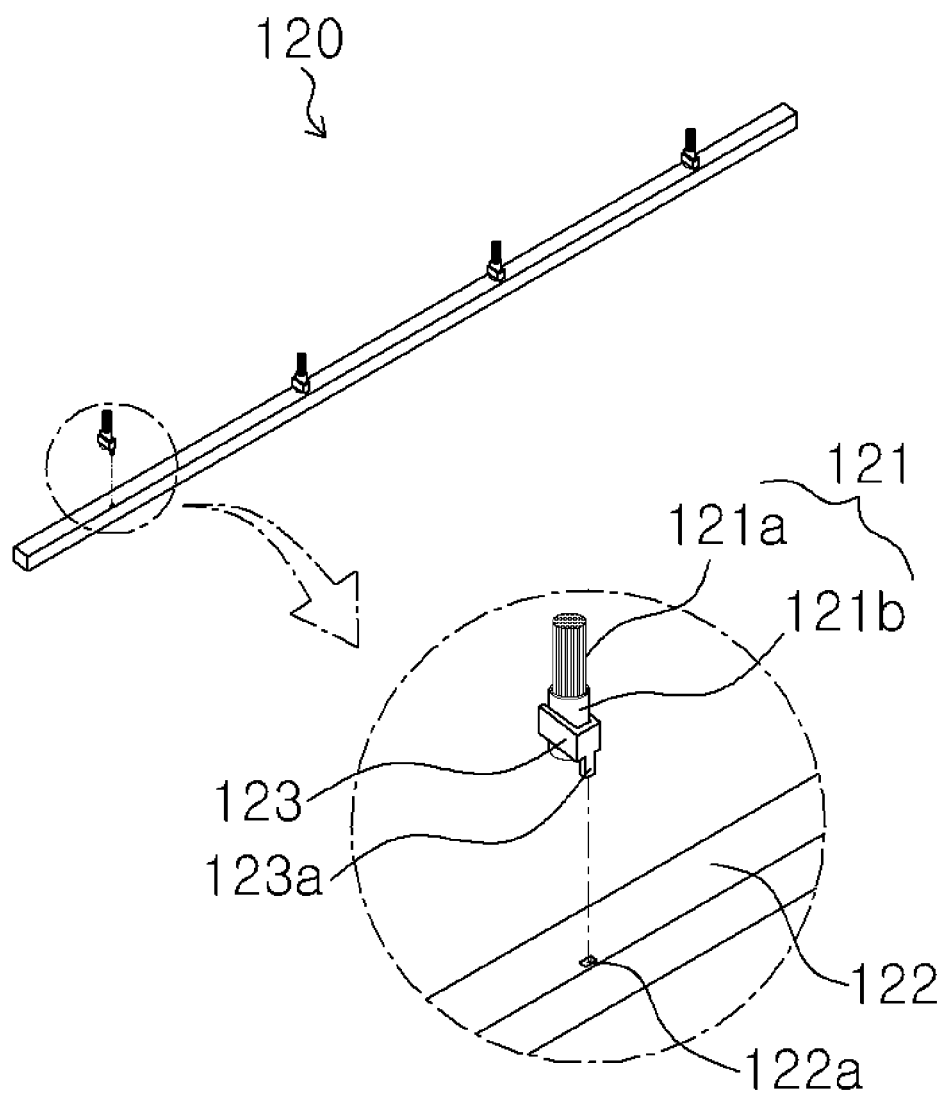
FIGS. 7 to 10 are perspective views showing a variety of second electrode parts for the electrification apparatus for the electrostatic dust collector according to the present invention.

The connector 123 as shown in FIG. 7, which fixes the protrusion 121 on top of the frame 122, has a U-shape. In more detail, the connector 123 has a convex portion 123a formed thereon and the frame 122 has a concave portion 122a formed thereon in such a manner as to insert the convex portion 123a thereinto. As a result, the convex portion 123a of the connector 123 is insertedly fixed to the concave portion 122a of the frame 122. To the contrary, of course, a concave portion (not shown) may be formed on the connector 123 and a convex portion (not shown) on the frame 122.

Figure 8:
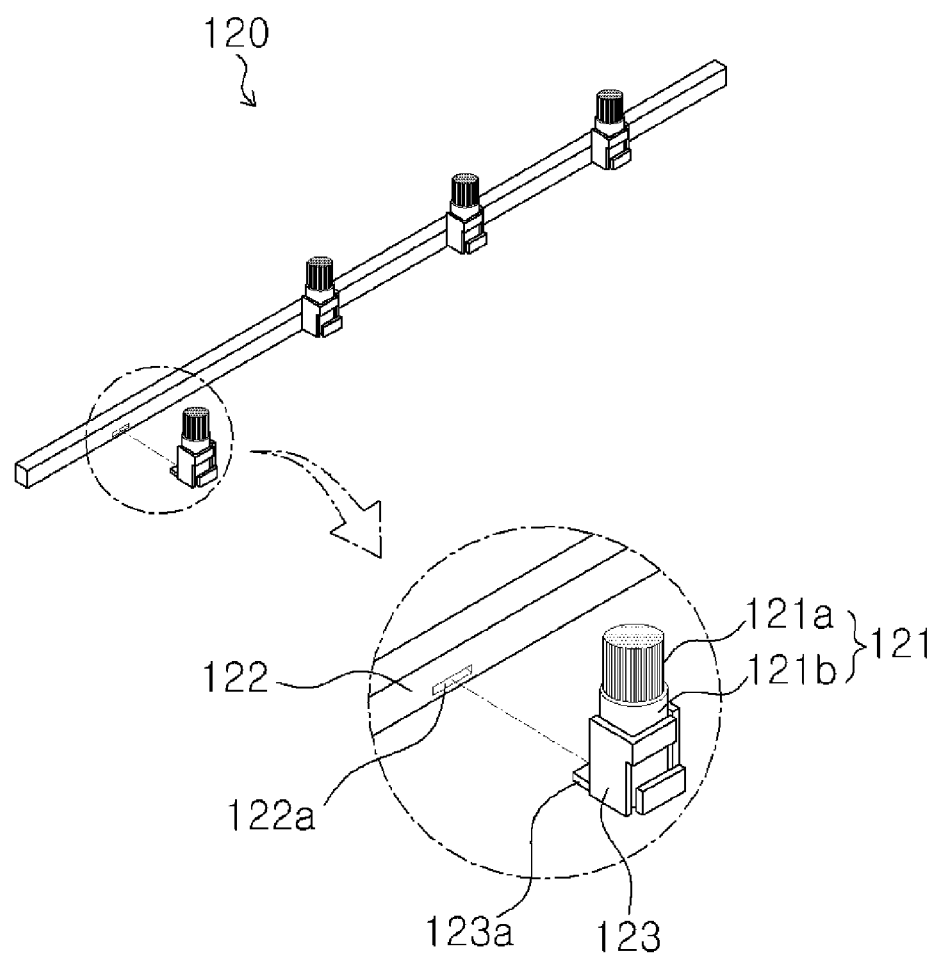

Moreover, as shown in FIG. 8, the connectors 123 are located on one side surface of the frame 122 and fix the protrusions 121 thereto. In this case, the electrification apparatus 100 for the electrostatic dust collector according to the present invention can decrease the whole height of the second electrode part 120, thereby advantageously reducing the whole size thereof.

On the other hand, the electrification apparatus 100 for the electrostatic dust collector according to the present invention may be configured wherein the connectors 123 and the frames 122 are fixed to each other by means of welding, the fixing structure using the concave portions 122a and the convex portions 123a, or the combination of the two.

As shown in FIG. 10, the electrification apparatus 100 for the electrostatic dust collector according to the present invention further includes a mounting part 130. The mounting part 130 has mounting holes 131 formed thereon in the corresponding shape to the second electrode part 120 in such a manner as to allow the protrusions 121 of the second electrode part 120 to protrude outwardly by given areas therefrom. That is, the mounting part 130 is adapted to fixedly protect the second electrode part 120 thereto. The protrusions 121 of the second electrode part 120 are connected to an electric wire 124. At this time, the mounting part 130 is desirably made of an insulation material so as to prevent electrification from being unnecessarily generated. Through the formation of the mounting part 130, accordingly, the electrification apparatus 100 for the electrostatic dust collector according to the present invention can fix the protrusions 121 to their accurate positions, protect the second electrode part 120 from the foreign matters contained in the air, and prevent the electrostatic dust collection performance from being low due to the occurrence of unnecessary electrification.

FIGS. 13 and 14 are graphs showing the electrostatic dust collection performance and ozone contents according to the applied voltages to the electrification apparatus 100 for the electrostatic dust collector according to the present invention and a comparison example having the same configuration as the present invention except pin-shaped protrusions. Even if the applied voltage is low, as shown in FIG. 13, the electrification apparatus 100 according to the present invention has higher electrostatic dust collection performance than the comparison example, and as shown in FIG. 14, has remarkably lower ozone contents than the comparison example. That is, the electrification apparatus 100 according to the present invention is provided with the protrusions 121 having the plurality of fine conductive fibers 121a, thereby having high electrification performance and reducing harmful ozone and electromagnetic waves.

On the other hand, the electrification apparatus 100 according to the present invention is configured wherein the first electrode part 110 and the second electrode part 120 are fixed to a case 140, and as shown in FIGS. 4 and 5, the second electrode part 120 is formed integrally with the case 140 (that is, the frames 122 are formed integrally with the case 140), while the first electrode part 110 is being seated on top of the case 140. The electrification apparatus 100 according to the present invention is not limited thereto, and of course, the shape of the case 140 and the fixing way of the case 140 are freely changed.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. An electrification apparatus for an electrostatic dust collector comprising:
a first electrode part having a shape of a plate having a plurality of circular through holes formed thereon to apply one of positive electrodes and negative electrodes thereto;
a second electrode part having a plurality of protrusions with a plurality of fine conductive fibers protruding outwardly from the through holes of the first electrode part, the fine conductive fibers arranged to be adjacent and parallel to each other so as to apply the other one of positive electrodes and negative electrodes thereto;
an electric wire is connected to the protrusions of the second electrode part; and
a mounting portion for surrounding the electric wire, wherein the mounting portion includes a protruding portion corresponding to the protrusions of the second electrode part, each of the protrusions of the second electrode part is inserted into a mounting hole formed in the protruding portion.

2. The electrification apparatus for the electrostatic dust collector according to claim 1, wherein the second electrode part has a plurality of frames, each of the frames supporting the protrusions corresponding to two or more of the through holes of the first electrode part.

3. The electrification apparatus for the electrostatic dust collector according to claim 2, wherein the frames and the protrusions of the second electrode part are fixed to each other.

4. The electrification apparatus for the electrostatic dust collector according to claim 2, wherein the second electrode part has connectors fixing the protrusions thereto, the connectors fixed to the frames.

5. The electrification apparatus for the electrostatic dust collector according to claim 4, wherein one of each of the connectors and each of the frames of the second electrode part has a convex portion formed thereon and the other one of each of the connectors and each of the frames of the second electrode part has a concave portion formed thereon to fixedly insert the convex portion thereinto.

6. The electrification apparatus for the electrostatic dust collector according to claim 4, wherein each of the connectors and each of the frames of the second electrode part are fixed to each other.

7. The electrification apparatus for the electrostatic dust collector according to claim 4, wherein each of the connectors of the second electrode part is fixed to a side surface of each of the frames.

8. The electrification apparatus for the electrostatic dust collector according to claim 1, wherein each of the protrusions has a fixing portion adapted to fix one side of the plurality of fine conductive fibers thereto.

9. The electrification apparatus for the electrostatic dust collector according to claim 1, wherein the protrusions have a circular or oval shape.

10. The electrification apparatus for the electrostatic dust collector according to claim 1, wherein the through holes of the first electrode part have a circular or oval shape.

11. The electrification apparatus for the electrostatic dust collector according to claim 1, further comprising a mounting part made of an insulation material and having mounting holes formed thereon to allow the protrusions of the second electrode part to protrude outwardly therefrom, while the protrusions of the second electrode part are being connected to an electric wire.

12. The electrification apparatus for the electrostatic dust collector according to claim 1, wherein the fine conductive fibers provide a dense and uniform configuration.

* * * * *